Feb. 7, 1967  A. W. NAGEL  3,302,930

VEHICLE MOVING SYSTEM

Filed July 31, 1964  5 Sheets-Sheet 1

INVENTOR.
ALFRED W. NAGEL
BY *Robert J. Schaap*
ATTORNEY

Feb. 7, 1967  A. W. NAGEL  3,302,930

VEHICLE MOVING SYSTEM

Filed July 31, 1964  5 Sheets-Sheet 2

INVENTOR.
ALFRED W. NAGEL
BY Robert J Schaap
ATTORNEY

Feb. 7, 1967    A. W. NAGEL    3,302,930
VEHICLE MOVING SYSTEM
Filed July 31, 1964    5 Sheets-Sheet 3
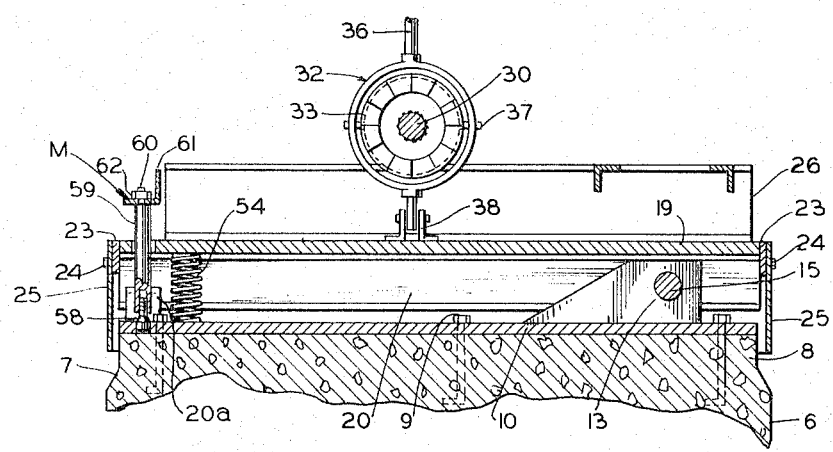
FIG. 6
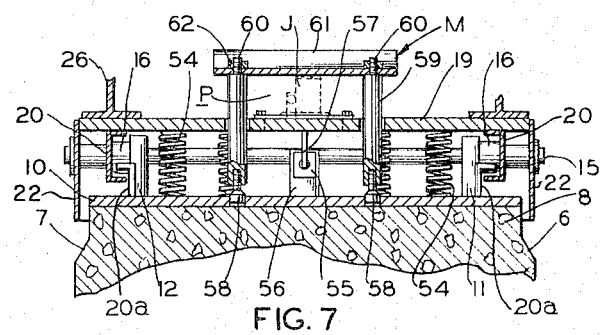
FIG. 7
FIG. 8
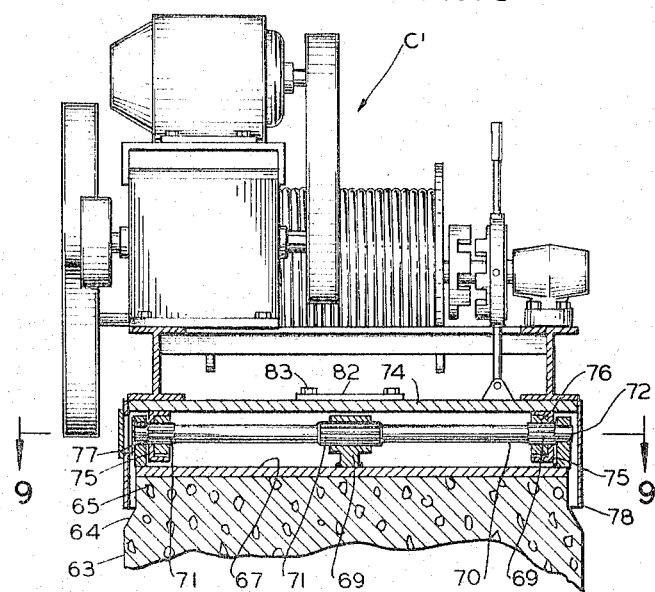
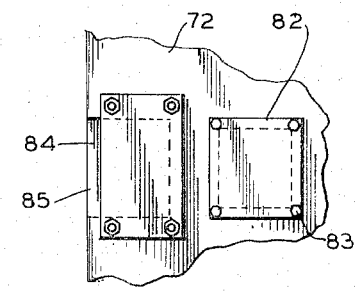
FIG. 11
INVENTOR.
ALFRED W. NAGEL
BY Robert J Schaap
ATTORNEY Feb. 7, 1967  A. W. NAGEL  3,302,930
VEHICLE MOVING SYSTEM
Filed July 31, 1964  5 Sheets-Sheet 4

INVENTOR.
ALFRED W. NAGEL
BY Robert J Schaap
ATTORNEY

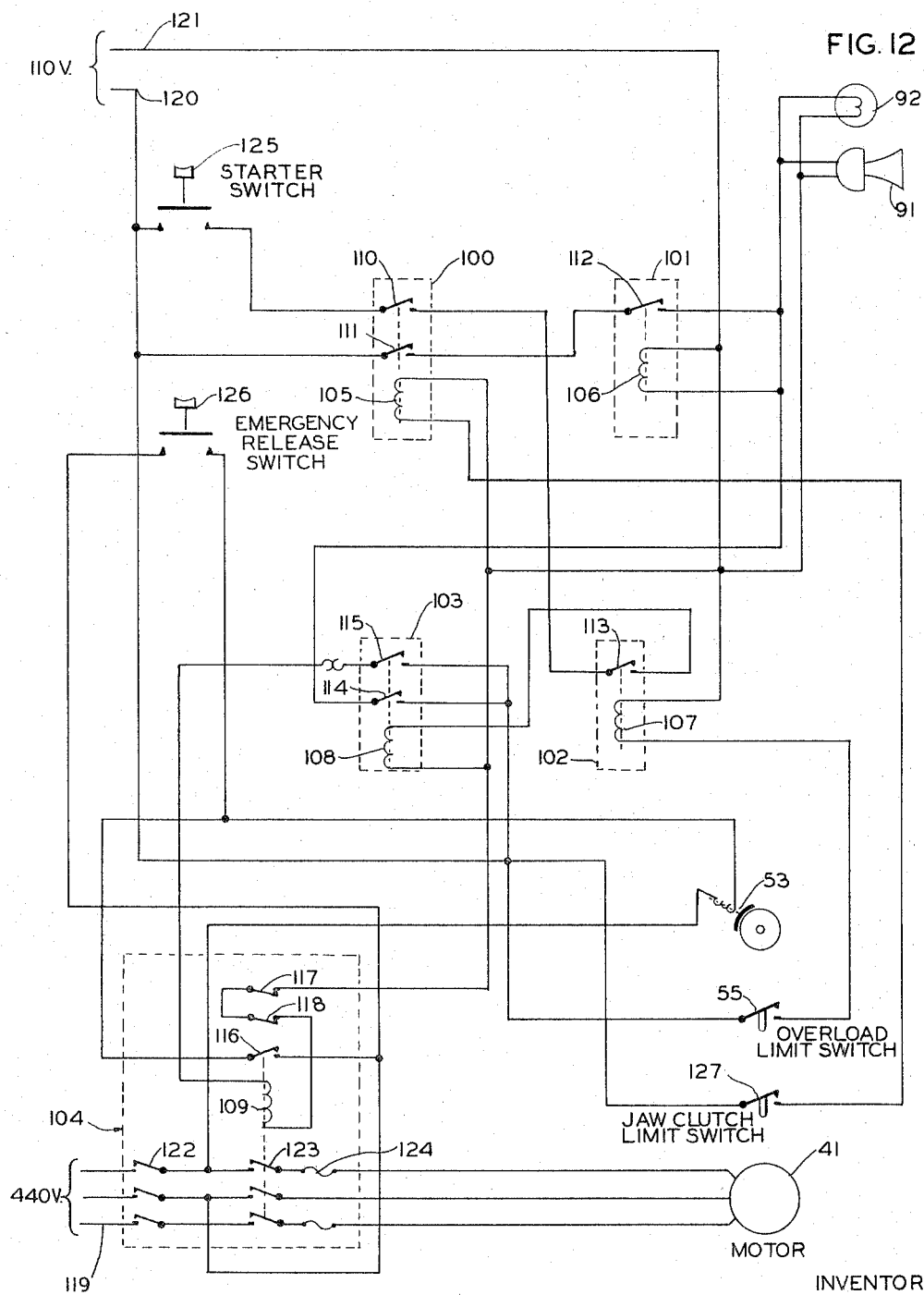

United States Patent Office 3,302,930
Patented Feb. 7, 1967

3,302,930
VEHICLE MOVING SYSTEM
Alfred W. Nagel, St. Louis, Mo., assignor to Monsanto Company, St. Louis, Mo., a corporation of Delaware
Filed July 31, 1964, Ser. No. 386,621
23 Claims. (Cl. 254—173)

This invention relates in general to certain new and useful improvements in vehicle moving systems and more particularly to vehicle moving systems which are provided with safety means to prevent overloading.

Vehicle haulers or so-called "car pullers" are often employed in industrial yards where freight is delivered and removed by means of railroad freight cars. The freight cars are generally moved into the yard area by means of switch engines and retained at particular locations until they are needed for loading or unloading. When a particular freight car is needed, it is generally moved to a loading or unloading station where the incoming freight contained in the car can be removed or the car can be filled with outgoing freight.

These car pullers generally comprise a power winch with a heavy cable which may be trained around some suitable pulley arrangement and is ultimately connected to the car to be transported. The conventional car pullers are provided with an electrical motor or similar prime mover which has sufficient power to move one or more cars as desired and the cable has sufficient internal strength, with a suitable safety factor, to withstand the load of moving the desired number of cars. However, the yardmen occasionally attempt to attach excessive loads to the cable, i.e. they often attach more than the recommended number of cars to the end of the cable and attempt to simultaneously move these cars to a desired location. This overloading of the car puller naturally puts an excessive strain not only on the cable but on the prime mover unit.

In an effort to avoid any injury to the prime mover units and to prevent the yardmen from attaching excessive loads to the cables, the electric motors which serve as the prime mover were often employed with overload limiting devices for automatically de-energizing the motor when an excessive load was maintained thereon. However, in industrial yards of this type, it is not difficult for the yardmen to find and replace the motor designed for the particular car puller unit with an oversized motor in an effort to frustrate any safety mechanism.

The cable to which the load is attached generally consists of strands of steel rope which are specifically wound in a bundle and through this structure, the cable has a fair amount of elasticity. When the cable is maintained in a taut position, by a load which is attached thereto, the cable has usually stretched to a considerable extent and if the excessive load should suddenly sever or snap the cable, it will immediately contract and generally fly through the air with great speed. The cable which has just snapped contains a great deal of internal energy so that it is capable of striking an object with a great amount of force thereby causing a large amount of property damage and bodily injury to the personnel in its pathway.

It is, therefore, the primary object of the present invention to provide a vehicle moving system which is provided with an interlocking safety control system capable of deenergizing the moving system upon overloading thereof and of rendering audible and visible warnings when a vehicle is being moved.

It is also an object of the present invention to provide a vehicle moving system of the type stated that will provide maximum safety for the personnel in the area.

It is another object of the present invention to provide a car puller which is internally provided with a safety interlock system for de-energizing a prime mover on the car puller when an excessive load is attached thereto.

It is a further object of the present invention to provide a car puller of the type stated which is capable of having its safety interlock mechanism adjusted for accommodating various loads and various types of cables.

It is an additional object of the present invention to provide a car puller having a safety interlock system of the type stated which is jam-proof and is internally disposed so that it is not subject to tampering.

It is another salient object of the present invention to provide an interlocking safety control system of the type stated which is capable of being employed in any area where it is desired to transport moving vehicles.

It is yet another object of the present invention to provide a car puller of the type stated which is rigid in its construction, efficient in its operation and which is capable of withstanding abuse normaly subjected thereto in freight yard environments.

With the above and other objects in view, my invention resides in the novel features of form, construction, arrangement and combination of parts presently described and pointed out.

In the accompanying drawings (5 sheets):

Figure 4:
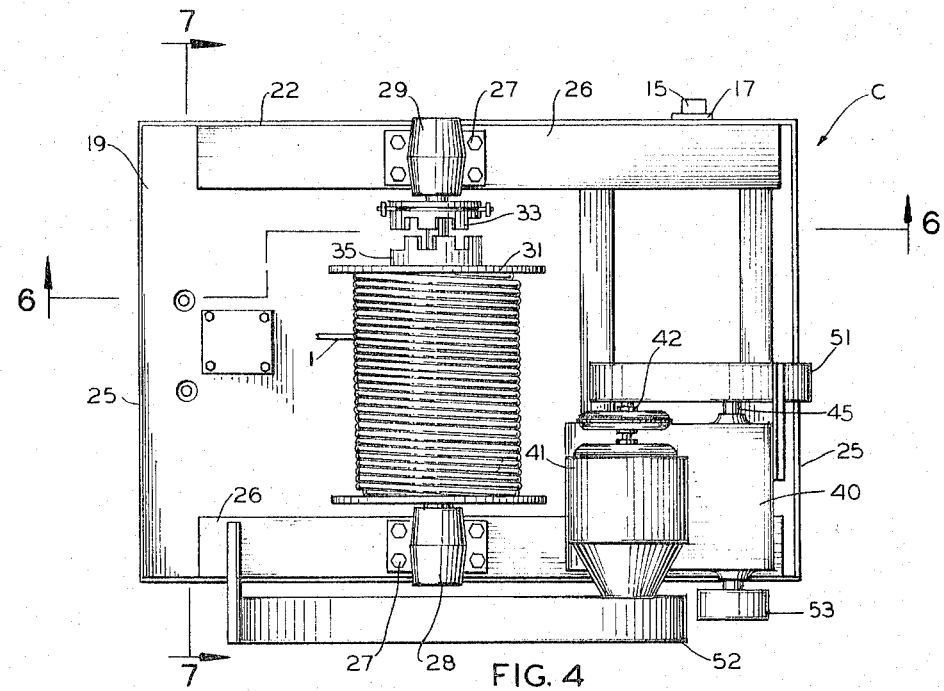
FIGURE 4 is a top plan view of the car puller of FIGURE 2.
Figure 9:
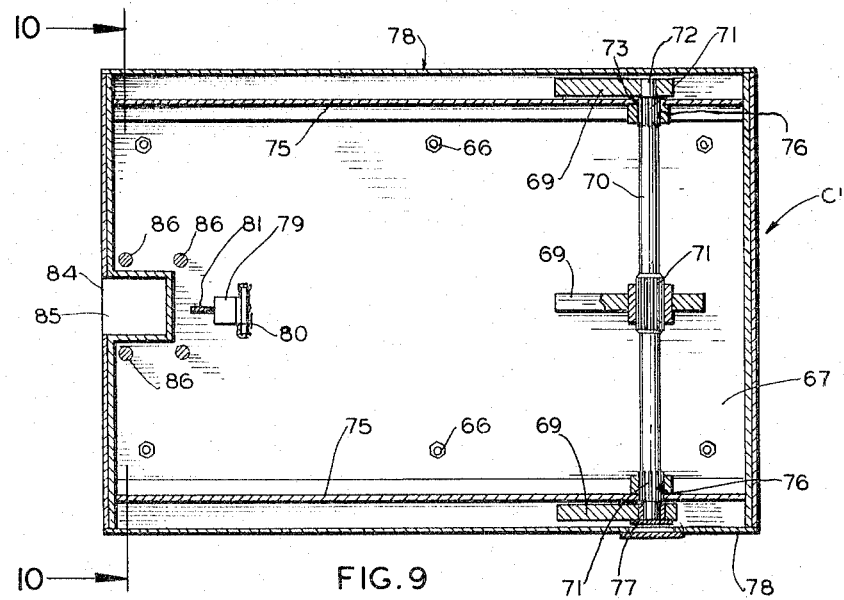
Figure 10:
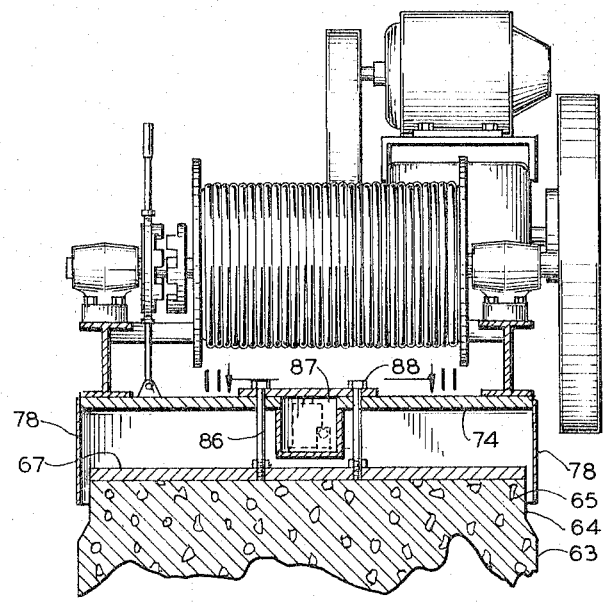

FIGURES 6 and 7 are vertical sectional views, partially broken away, taken along lines 6—6 and 7—7, respectively, of FIGURE 4;

FIGURE 8 is a rear elevational view, partially broken away and in section, of a modified form of car puller constructed in accordance with and embodying the present invention;

FIGURE 9 is a horizontal sectional view taken along line 9—9 of FIGURE 8;

FIGURE 10 is a vertical sectional view, partially broken away, taken along line 10—10 of FIGURE 9;

FIGURE 11 is a fragmentary sectional view taken along line 11—11 of FIGURE 10; and FIGURE 12 is a schematic view of the electrical circuitry forming part of the vehicle moving system of the present invention.

*General description*

Generally speaking, the vehicle moving system of the present invention generally comprises a car puller unit which is electrically connected to and operable from a control housing remotely located to the car puller. Operatively connected to the car puller is a cable which may be connected directly to the vehicle to be moved, or trained around a dual direction sheave and/or a series of snatch blocks which are located in selected positions along a trackway.

The car puller generally comprises a concrete foundation block which is suitably embedded within the ground and mounted on the rearward end is a shaft for pivotally retaining a support plate. The support plate retains a spool-drum around which is trained a relatively heavy steel cable for ultimate connection to the vehicles which are to be transported. The spool-drum is powered by a suitable prime mover, such as an electric motor, through a fluid coupling and gear reducing system. The car puller is also provided with a jaw clutch which is capable of disengaging the prime mover from the spool-drum and is also provided with an electric brake for physically locking the drum in any selected position when the vehicle is pulled to a desired location. A limit switch serving as a sensing mechanism is provided for electrically deenergizing the prime mover when an excess weight is attached to the free end of the cable. A plurality of compression springs are interposed between the foundation block and support plate and are designed to bias the support plate upwardly and maintain the limit switch in a closed position for completion of a circuit to the prime mover, permitting the latter to be energized. As tension is maintained on the cable, the plate will be pulled downwardly against the action of the compression springs, Since the spool-drum is located on a higher horizontal plane than the point of pivotal attachment of the support plate to the foundation block, the weight attached to the free end of the cable which maintains the cable under tension will cause a force on the spool-drum, the force being represented by a vertical vectorial component and a horizontal vectorial component. If the force represented by the downward vector is sufficient to overcome the upward bias maintained by the compression springs, the limit switch will open thereby breaking the circuit to the electric motor.

In order to regulate the amount of upward bias maintained by the compression springs and adjust the amount of pressure required to open and close the limit switch, a removable testing apparatus is provided for periodically measuring the amount of pressure required to shift the plate downwardly. A mechanism is also provided for adjusting the position of the limit switch so that it is capable of opening and closing at preselected pressures.

The present invention also includes a modified form of car puller which differs from the aforementioned embodiment in that the means for supporting and shifting the plate upwardly against the action of the cable resides in a torsion bar. The present car puller also includes a means for periodically measuring the amount of pressure required to lift the plate and a mechanism for adjusting the position of the limit switch, so that it is capable of opening and closing at preselected pressures.

The control housing includes a pushbutton starter switch and a manual disconnect switch or so-called emergency release switch. When it is desired to move a vehicle to a particular location, the jaw clutch is manually moved to the engaged position and the operator within the control housing depresses the starter switch. This switch is provided with a time delay action during which period visible and audible signal means will advise the yardmen that the car puller will shortly be energized. By this means, the yardmen know that they should move to a position where they would be clear from the pathway of the movement of the cable if the same should sever. The vehicle is then pulled to a desired location where the operator releases the starter switch. The jaw clutch is interlocked with the electrical system so that the signals and the car puller will not start without the clutch being properly engaged and the signal will not stop until the clutch has been disengaged. The car pullers of the present invention can optionally be provided with an electric brake which is designed to automatically hold the vehicle after interruption of power to the prime mover until the brake itself has been manually released. The electric brakes are particularly desirable in those locations where the cars are to be moved on steep grades.

*Detailed description*

Referring now in more detail and by reference characters to the drawings which illustrate practical embodiments of the present invention, A designates a vehicle moving system generally comprising a car puller C which is more fully hereinafter described in detail and which is electrically connected to and operable from the control housing H. The car puller C has a suitable mechanism for retaining a heavy steel cable 1 and which is trained around a dual direction sheave 2, similar to the type described in United States Letters Patent No. 655,851. The cable 1 is then trained around any of a series of snatch blocks 3 similar to the type described in United States Letters Patent No. 1,736,193 which are spaced along a trackway 4, the latter being of any suitable standard gage to accommodate railroad freight cars or similar freight vehicles V. The cable 1, of course, is suitably provided with a conventional hook 5 for removable attachment to the vehicle V. By reference to FIGURE 1, it can be seen that the snatch blocks 3 are located at selected positions along the trackway 4 and on both sides of the car puller C so that the vehicle V may be moved from any side of the car puller C. The dual direction sheave 2 which is of the type described in United States Letters Patent 655,851 is adapted to flip from one direction to the other so that the vehicle V may be moved to either direction with respect to the car puller C. The snatch block 3 is not necessary, but can be optionally used depending upon the location and orientation of the car puller C with respect to vehicle paths and the positions in which it is desired to move the vehicle V.

Figure 5:
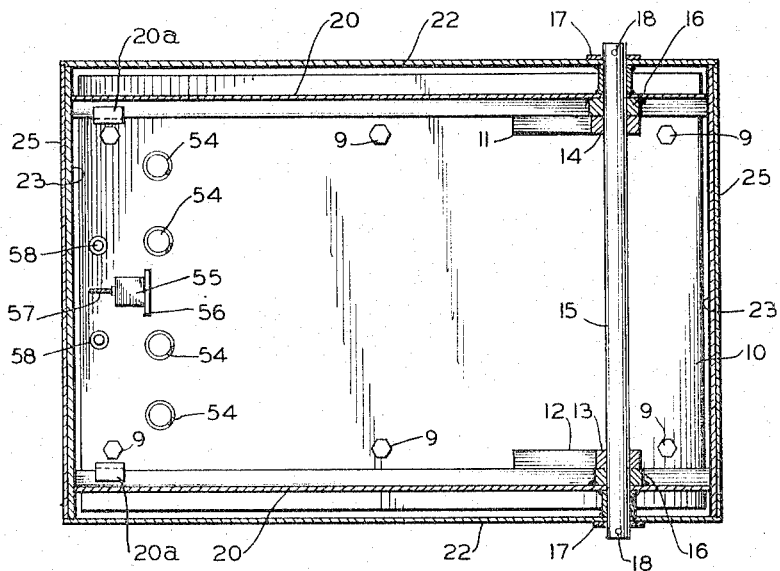
FIGURE 5 is a horizontal sectional view taken along line 5—5 of FIGURE 2.

The car puller C generally comprises a relatively heavy foundation block 6 which is suitably embedded within and securely attached to the ground or any other suitable supporting structure. The foundation block 6 is rectangular in horizontal cross-section and is provided with a bevelled face 7 along its upper surface and merges into an upstanding head 8 which is somewhat reduced in horizontal cross-sectional area. Facewise disposed upon and rigidly secured to the upper surface of the upstanding head 8 by means of bolts 9 is a relatively flat heavy steel foundation plate 10. Welded or otherwise rigidly secured to the upper face of the support plate 10 spaced inwardly of the longitudinal margins somewhat in close proximity to the rearward margin of the plate 10, reference being made to FIGURE 5, are a pair of opposed parallel upstanding brackets 11, 12 which retain roller or sleeve bearings 13, 14 respectively for journaling a transversely extending pivot rod or shaft 15. Concentrically disposed about the rod 15 and bearing flushwise against the exterior faces of each of the respective brackets 11, 12 are annular bearing rings 16. The pivot rod 15 is retained within the brackets 11, 12 by means of washers 17 and cotter pins 18 on each of the transverse ends thereof, substantially as shown in FIGURE 5.

Figure 2:
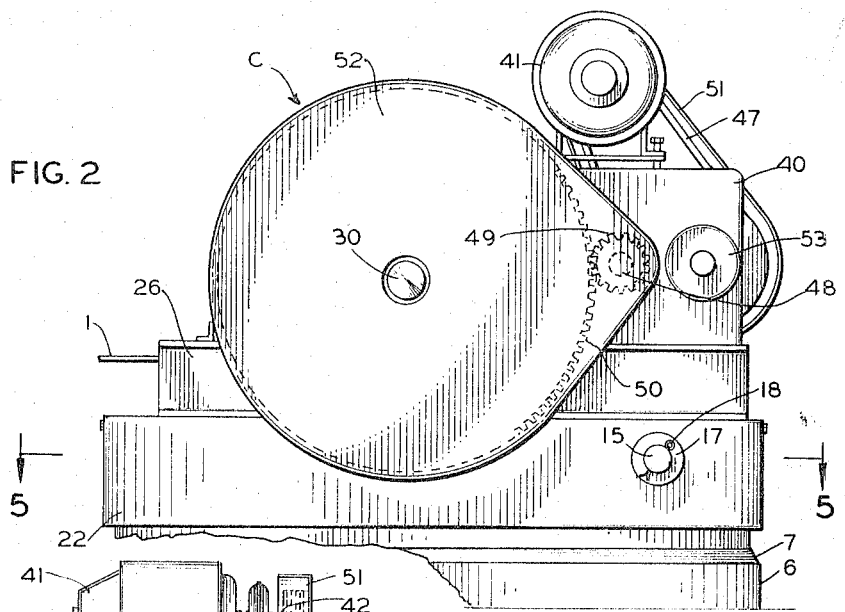
FIGURE 2 is a side elevational view partially broken away, of the car puller forming part of the vehicle moving system and which is constructed in accordance with and embodies the present invention.
Figure 3:
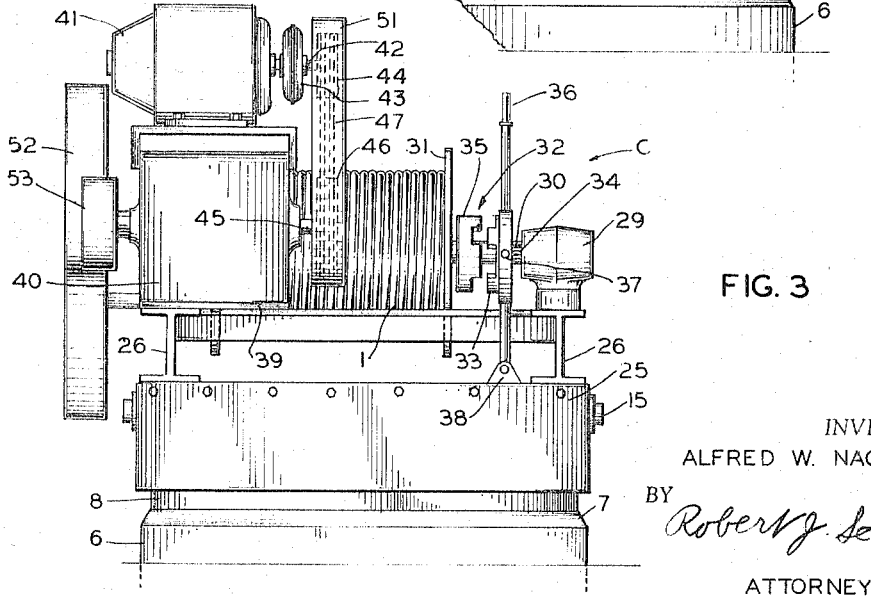
FIGURE 3 is a rear elevational view of the car puller of FIGURE 2.

A relatively flat heavy steel support plate 19 having a pair of transversely aligned depending channel-forming brackets 20 in transverse alignment with the pivot rod 15 is pivotally mounted on the rod 15. Each of the brackets 20 is formed of U-shaped channels and are mounted in close proximity to the longitudinal margins of the plate 19 and extend for the greater portion of the length thereof. By reference to FIGURE 7, it can be seen that the support plate 19 is spaced upwardly from the plate 10, and is provided along its longitudinal margins with longitudinally extending cover plates 22. Moreover, welded to each of the transverse margins of the plate 19 are depending flanges 23 and secured to each of the depending flanges 23 by means of bolts 24 are transversely extending cover plates 25. By further reference to FIGURES 6 and 7, it can be seen that the cover plates 22 and 25 extend below the plate 10 at all times, that is when the support plate 19 is pivoted to its lowermost position as is shown in FIGURES 2 and 3 or when the plate 19 is shifted to its uppermost position.

Welded to the upper surface of the support plate 19 adjacent to the longitudinal margins thereof are a pair of longitudinally extending I-beams 26 which serve as support rails. Rigidly secured to the upper surface of the horizontal flange portions of the I-beams 26, by means of bolts 27, are transversely aligned pillow blocks 28, 29, and extending between and journalled in the pillow blocks 28, 29 is a rotatable drum shaft 30. Concentrically disposed upon and being independently rotatable with respect to the drum shaft 30 is a cable drum 31 and interposed between the cable drum 31 and the pillow block 29 is a jaw clutch 32. The jaw clutch 32 is conventional in its construction, and generally comprises a jaw plate or so-called "gear wheel" 33 which shifts axially along a splined portion 34 of the drum shaft 30. Through this construction, the jaw plate 33 is shiftable axially along the splined portion 34 and is rotatable with the drum shaft 30. The gear wheel 33 is optionally engagable with a matching jaw plate or so-called "gear wheel" 35 which is rigidly secured to one of the transverse side plates of the cable drum 31 and is disposed within axial alignment with the jaw plate 33, substantially as shown in FIGURE 4. The gear wheel 33 is conventionally provided with a handle 36 which is pivotally mounted on the gear wheel 33 by means of a pin 37 and is supported on an upstanding clevis 38 welded to the upper surface of the plate 10, substantially as shown in FIGURE 3. Through the above outlined construction, it can be seen that the cable drum 31 can be rotated independently of or with the rotatable drum shaft 30 by engagement or disengagement of the jaw clutch 32.

Welded to and extending between each of the support rails 26, and being secured thereto adjacent to the rearward end, is a transversely extending mounting plate 39. Welded or otherwise rigidly secured to the upper surface of the mounting plate 39 is a speed reducer 40, which is conventional in its construction and is therefore neither illustrated nor described in detail herein. Rigidly mounted on the speed reducer 40 is a conventional 220 or 440 horsepower electric motor 41 having a drive shaft 42.

Secured to the outer end of the drive shaft 42 is a fluid coupling 43 which is provided with a V-belt pulley 44 for driving a high-speed drive shaft 45 forming part of the speed reducer 40. The shaft 45 is provided with a V-belt pulley 46 in alignment with the pulley 44, and trained around each of the pulleys 44, 46 is a V-belt 47. The speed reducer 40 is also provided with a low-speed, high-power or so-called "output" shaft 48 which is provided with a pinion gear 49 at its outer end and which in turn is retained in meshing engagement with a relatively large diameter spur gear 50, secured to the outer end of the transversely extending shaft 30 for driving the cable drum 31. By reference to FIGURES 2 and 4, it can be seen that the pulleys 44, 46 and V-belt 47 are provided with a shield 51 and the pinion gear 49 and spur gear 50 are similarly provided with a shield 52. Through the above outlined construction, it can be seen that the electric motor 41 through the V-belt 47 and related V-belt pulleys 44, 46, the speed reducer 40, and pinion gear 49 and spur gear 50 will drive the cable drum 31. Furthermore, it can be seen that the fluid coupling 43 will prevent any sudden over-loading of the car puller C. The fluid coupling 43 will have the proper internal configuration to give a very slow torque build-up and yet render the desired maximum torque transmission. A constant viscosity fluid for variable weather conditions, such as a commercially available 10W30 "all season" oil or hydraulic fluid will be used to maintain the desired torque delivery within acceptable limits, regardless of temperature variation.

An electrically actuated brake 53 which is operatively connected to the speed reducer 40 can be optionally provided with those units which are designed to handle vehicles on grades, especially where the vehicle is to be moved upwardly on a relatively steep incline. The electric brake 53 is of the "fail-safe" type and any interruption of electric power to the electric motor 41 will automatically cause application of the brake 53. The electric control circuit for performing this function is more fully described hereinafter in detail.

The car puller C is provided with a safety interlock system which is designed to prevent actuation of the motor 41 and hence the cable drum 31 if an excessive weight is attached to the cable 1. The safety interlock system includes a series of four transversely aligned compression springs 54 which are secured to the plate 10 and are located on opposite transverse ends thereof with respect to the pivot rod 15. The compression springs 54 are designed to bear against the underside of the plate 19 and thereby bias the same upwardly about the pivot rod 15. By reference to FIGURE 6 it can be seen that the compression springs 54 will have a tendency to pivot the plate 19 in a clockwise direction about the pivot rod 15. The plate 19 is limited in its movement as it reaches its uppermost limit through the action of the lower flange of the channel 20 engaging the upper flange of a series of hold-down clips 20a which are mounted on the plate 10 as shown in FIGURE 7.

Inasmuch as the cable pull is essentially horizontal and the cable drum 31 is located on a higher horizontal plane than the pivot shaft 15, the pull of the vehicle V on the cable 1 creates a force having a horizontal and a vertical vector component on the plate 19. The vertical downward force will compress the springs 54 until the downward force is balanced by the upward bias of the compression springs. Increased pull results in greater compression of the springs 54 until the plate 19 reaches its lowermost or "overload" position substantially as shown in FIGURES 6 and 7. If however the compression springs 54 create a greater upward force than the force represented by the downward vector established by the pull on cable C, then the plate 19 will swing upward about the shaft 15 in a clockwise direction, reference being made to FIGURE 6, to its "unloaded" position, with no pull on the cable C.

An overload limit switch 55 is mounted on an upstanding bracket 56 which is in turn secured to the upper face of the foundation plate 10, substantially as shown in FIGURE 7. The limit switch 55 is operable by an actuator 57 which is secured to the underside of the plate 19 and is designed to actuate the limit switch 55 through the shifting movement of the plate 19. The overload limit switch 55 is connected to the electrical circuitry which energizes and de-energizes the motor 41, the circuitry to be hereinafter described in detail. Thus if an excessive load has been connected to the cable 1, the plate 19 will be urged downwardly against the action of the springs 54 and the limit switch will open, thereby breaking the current circuit to the motor 41. If, however, the upward bias of the springs 54 is greater than the downward vector of the force maintained by the cable 1, the plate 19 will be biased upwardly, thereby maintaining the limit switch 55 in a closed position. In this manner, a circuit will be completed to the electric motor 41.

A pair of upstanding studs 58 are secured to the foundation plate 10 on opposite sides of the bracket 56 in the manner as shown in FIGURE 7. Threadedly secured to the studs 58 and being removable therefrom are a pair of upstanding support rods 59 forming part of a limit switch measuring and adjusting mechanism M. The rods 59 are provided at their upper ends with diametrically reduced threaded sections 60 for retaining a pressure plate 61, the latter being secured to the rods 59 by means of nuts 62 thereby forming a test pocket P. By further reference to FIGURE 7 it can be seen that it is possible to interpose a test jack shown in dotted lines between the pressure plate 61 and the upper surface of the plate 19. Through this construction, it is possible to elevate the jack and maintain pressure on the pressure plate 61. This will cause a downwardly directed force on the plate 19 forcing the same downwardly against the compression springs 54. In this manner, it is possible to measure the amount of force required to shift the plate 19 and thereby provide a basis for adjusting the limit switch 55 to a desired actuating position. After the testing operation has been completed, the testing mechanism M can be removed by merely removing the plate 61 from the rods 59 or by threadedly disconnecting the rods 59 from the upstanding studs 58. Access to the compartment housing the limit switch 55 is provided by removing the bolts 24 and the forwardly located cover plate 25.

It is possible to provide a modified form of car puller unit C', substantially as shown in FIGURES 8–11 inclusive. The car puller C' is substantially similar to the car puller C but is provided with a modified form of safety interlock means.

The car puller C' generally comprises a relatively heavy foundation block 63 which is provided with a bevelled face 64 along its upper surface and integrally merges into a somewhat reduced upstanding head 65 which is somewhat reduced in horizontal cross-sectional area. Facewise disposed upon and being rigidly secured to the upper surface of the upstanding head 65 by means of bolts 66 is a relatively flat heavy steel foundation plate 67. Welded or otherwise rigidly secured to the upper surface of the foundation plate 67 in close proximity to the rearward margin of the plate 67 are three transversely spaced and aligned upstanding brackets 69 for supporting a transversely extending torsion bar or shaft 70 having three axially spaced splined sections 71, one of which is engaged by the center bracket 69 which is also provided with a matching splined section. On its right transverse end, the torsion bar 70 is provided with a reduced end 72 which extends through an aperture formed in one of the end upstanding brackets 69. The reduced end 72 is formed with an annular bearing shoulder 73 which bears against the interior face of the bracket 69 and retains the shaft 70 in position.

Secured to the torsion bar 70 and being moveable therewith is a support plate or mounting plate 74 having a pair of transversely spaced depending brackets 75. The brackets 75 are also internally provided with splined portions 76 and which engage the outer splined portions of the torsion bar 70. The other end of the shaft 70 passes through an aperture formed in the other end upstanding bracket and is secured by means of a retainer plate 77 which is secured to the end thereof. Depending cover plates or face plates 78 are secured to the peripheral margins of the plate 74 and extend around the periphery of the mounting plate 74 and extend below the foundation plate 67 in the manner as shown in FIGURE 8. The cover plate 78 covering the retainer plate 77 is removably secured, providing access to the torsion bar 70.

Through the above outlined construction, it can be seen that the torsion bar 70 is so mounted within the upstanding brackets 69 so that the mounting plate 74 is normally biased to its uppermost position. This upwardly directed force maintained by the torsion bar 70 is counterbalanced by the downwardly directed vertical vector of the force on the cable 1 and hence the cable 1 will tend to pivot the plate 74 to its lowermost position against the action of the torsion bar 70.

The remainder of the components mounted on the upper surface of the plate 74 are substantially identical to the components described in the car puller C and include a jaw clutch 32' which is designed to operate a cable drum 31', the latter being powered by an alternating current electrical motor 41' operating through a speed reducer 40', all of which are substantially identical to the previously described jaw clutch 32, cable drum 31, electric motor 41, and speed reducer 40, respectively.

The car puller C', however, is provided with a safety interlock means which differs somewhat from the safety interlock means described in the car puller C. A safety limit switch 79 is mounted on an upstanding bracket 80, the latter being welded or otherwise rigidly secured to the upper surface of the foundation plate 67. The safety limit switch 79 is actuated by an actuator rod 81, the latter being secured to the underside of the mounting plate 74, substantially as shown in FIGURE 9. In order to prevent tampering with the safety limit switch 79, it remains hidden from view, and access is maintained through an aperture formed in the mounting plate 74 and disposed over the aperture is a cover plate 82 secured thereto by means of a plurality of removable bolts 83. Thus when it is desired to adjust the safety limit switch 79, the bolts 83 are removed and the plate 82 can be lifted from the aperture, thereby providing access to the safety limit switch 79.

To measure the amount of upwardly directed force maintained by the torsion bar 70, and thereby adjust the safety limit switch 79, the forward face plate 78 is provided somewhat centrally thereof with a rectangular aperture 84 providing access to a test pocket 85 substantially as shown in FIGURES 9 and 10. Rigidly secured to the foundation plate 67 and extending upwardly therefrom are four spaced support rods 86 which are located at the four corners of the test pocket 85 and which also extend upwardly through apertures formed within the mounting plate 74. A test plate 87 having four apertures in alignment with the support rods 86 is disposed thereon and lays in facewise engagement with the upper surface of the mounting plate 74. The test plate 87 is secured by means of removable nuts 88 secured to the upper threaded ends of the rods 86. Thus when it is desired to measure the amount of upwardly directed force maintained by the torsion bar 70, a jack can be inserted in the test pocket 85 and extended until the movable piston of the jack engages the undersurface of the test plate 87. Inasmuch as the rods 86 are secured to the foundation plate 67, the extension of the test jack will urge the mounting plate 74 downwardly against the action of the torsion bar 70 and thus by knowing the amount of force required to shift the plate 74 downwardly, it is possible to adjust the safety limit switch 79.

In each of the car pullers C and C', it can be seen that the heavy steel base or foundation plate provides a substantial mounting for each of the components mounted thereon. The alternating current electrical motors 41 and 41' are totally enclosed and can be conventionally mounted on a take-up base if desired. Moreover, the high speed reduction from the speed reducer 40 and 40' is maintained through V-belts which permit changes in speed by substituting sheaves of different diameters.

Figure 1:
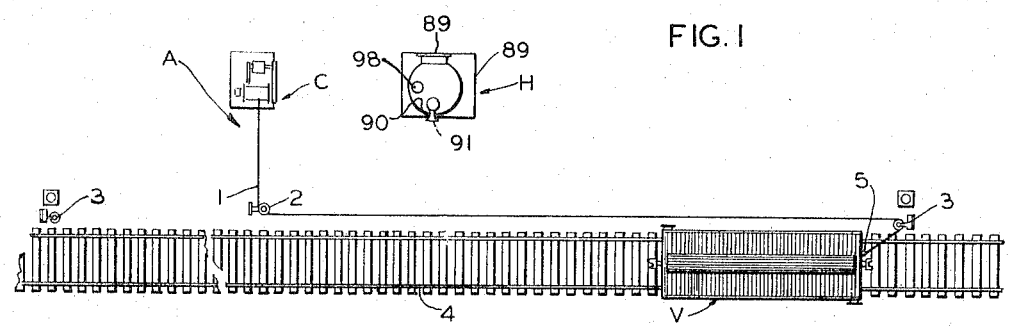
FIGURE 1 is a schematic top plan view showing the various components of the vehicle moving system constructed in accordance with and embodying the present invention.

Each of the car pullers C, C' are conveniently used in the vehicle moving system A, substantially as shown in FIGURE 1. Moreover, they are operable from the control housing H through the electrical circuitry which is schematically illustrated in FIGURE 11. The control housing which is more fully illustrated in FIGURE 1 is provided with an open doorway 89 which opens into a relatively circular interior 90 in which are located the controls for operating the circuitry to be hereinafter described. By further reference to FIGURE 1, it can be seen that the doorway 89 is located at a position where it opens away from the car puller C. In this manner, if the cable 1 should sever, there is less chance that the cable would swing into the interior of the control housing H. The control housing H is also provided with a horn 91 and a flashing warning light 92. It is, of course, possible to provide other warning lights or horns as needed in the area at suitable locations. The horn 91 will be distinctive, of course, in sound and will be unlike any warning signal in the area. The horn 91 and warning light 92 are operable in a manner to be hereinafter described and will provide warning that vehicles within the area are being moved by the car puller. The signals will operate for a predetermined time before the car puller C or the unit C' begin to operate and continue their signal until the car puller is de-energized and the clutch 32 is disengaged.

Electrical circuitry

The electrical circuitry forming part of the vehicle moving system A is more fully illustrated in FIGURE 12 and comprises relays 100, 101, 102, a time delay relay 103, and a motor starter relay 104. The relays 100, 101 and 102 are respectively provided with relay coils 105, 106 and 107. The time delay relay 103 is similarly provided with a relay coil 108 and the motor starter relay 104 is also provided with a relay coil 109.

The relay 100 also includes a set of normally open contacts 110, 111, the relay 101 includes a set of normally open contacts 112 and relay 102 includes a set of normally open contacts 113. The relay 103 includes a set of normally open contacts 114 and a set of normally open time delay contacts 115. The time delay contacts 115 are maintained preferably with a 15 second time delay interval; so that in other words, these contacts will actuate at a period which is 15 seconds beyond the actuation of the coil 108. The relay 104 includes a set of normally open motor auxiliary contacts 116 which are operable by the coil 109 and a set of normally closed overload switches 117, 118. The motor 41 is electrically connected to a suitable source of 440 volt alternating electrical current through a three conductor cord set 119 and the control circuit itself, is operable by 110 volt alternating electrical current which it receives through a set of conductors 120, 121. Interposed between the source of 440 volt electrical current and the motor 41 is a main power control switch 122 and interposed within each of the conductors of the cord set 119 are a set of normally open contacts 123, which are actuable by the coil 109. A set of heaters 124 are also interposed in two of the conductors of the cord set 19 and are designed to actuate the overload switches 117, 118.

The electrical circuitry as schematically illustrated in FIGURE 12 also includes a momentary push-button starter switch 125 and a manual disconnect or so-called "emergency release" switch 126, each of which are preferably mounted within the control panel of the control housing H. The jaw clutch 32 also includes a jaw clutch limit switch 127, which is normally open when the jaw clutch 32 is disengaged, and is closed when the jaw clutch 32 is in the locked position, thereby connecting the cable drum 31 to the motor 41. Each of the aforementioned components forming part of the control circuit, are electrically connected as schematically illustrated in FIGURE 12. It should, however, be understood that the actual mounting or placing of the various components is not the subject matter of an inventive concept, and many of the components, such as the relays 100, 101 and 102 can be conveniently located within the control housing H.

Operation

In use, the car puller C and, if required, the dual direction sheave are located along a convenient trackway in a railroad yard where it is desired to move any of a selected number of cars to a desired position through the car puller C. The control housing H is remotely disposed from but nevertheless located in proximity to the car puller C. One or more snatch blocks 3 may be located at selected positions along the trackway 4 so that any of the vehicles V may be moved to a desired position. For example, referring to FIGURE 1, the snatch block 3 would not be used but the cable 1 would be attached directly to the left end of the vehicle V if it were desired to pull such vehicle to a position adjacent to the snatch block 3. On the other hand, if it were desired to move the vehicle V to the right, reference being made to FIGURE 1, the snatch block 3 would be employed and the cable 1 would be attached to the right hand end of the vehicle V.

When it is desired to move the vehicle V to a selected position, the hook 5 is connected to the vehicle V and the car puller C can be operated by an operator located within the control housing H.

When the jaw clutch 32 is disengaged, the cable drum is freely rotatable on the shaft 30 and is in effect disconnected from the motor 41. At this point, of course, the vehicle which is ultimately to be moved would be set by its own brakes. Accordingly, prior to the release of the brakes on the vehicle, the jaw clutch 32 is engaged. This is accomplished by shifting the handle 36 inwardly causing the gear wheel 33 to engage with the gear wheel 35 on the cable drum 31. Inasmuch as the gear wheel 33 is shiftable on a splined portion of the shaft 30, the cable drum 31 is then in position to rotate with the shaft 30. The jaw clutch 32 is also interlocked with the electrical control system by means of the jaw clutch limit switch 127 so that the car puller C cannot be actuated when the jaw clutch 32 is disengaged. Moreover, the jaw clutch 32 cannot be disengaged after use of the car puller C while tension has been maintained on the cable 1. This safety mechanism will insure that the operator does not hold the vehicle V on a grade by use of the magnetic brake 53 and thereby maintain the cable 1 under tension.

After the jaw clutch 32 has been engaged, the operator in the control housing will press and hold the starter switch in order to energize the electric motor 41. When the starter switch 125 is closed, the horn 91 will sound and the light 92 will flash for a period of 15 seconds prior to the energization of the motor 41. This warning signal will give the yardmen in the area sufficient time to move to a safe location. After the 15 second time interval, the motor 41 will be energized and thereby rotate the shaft 30 through the speed reducer 40. The fluid coupling 43 will provide a slow torque build-up and also provide a desired maximum torque transmission to the speed reducer 40. As the cable drum 31 rotates, it will wind thereon the cable 1 and pull the vehicle V to a selected position.

As tension is maintained on the cable 1, a force will be created which can be represented by a horizontal vector component and a vertical vector component. If the force represented by the vertical vector is less than the upward force provided by the springs 54, the plate 19 will be biased upwardly from its seated position against the foundation plate 10. When the plate 19 has been biased upwardly, the limit switch 55 will remain closed, thereby permitting a completed circuit to the electric motor 41. However, if an excessive load is attached to the cable 1 the vertical component of the vectorial force represented by the cable 1 will be greater than the upward bias maintained by the compression springs 54. As this occurs, the plate will be biased downwardly to its lowermost position. As this occurs, the actuator 57 will open the limit switch 55 thereby preventing a completed circuit to the motor 41. The limit switch 55 will therefore always remain in the open position as long as an excessive load is maintained on the cable 1.

If the load maintained on the cable 1 is not excessive, the cable drum 31 will rotate and pull the car to a selected position. After the vehicle V has been moved to its selected position, the operator releases the starter switch 125. This will de-energize the motor 41 and hold the vehicle V in its position. At this point, the magnetic brake 53 is actuated and will hold the vehicle V in this position, even on a slope, until the brakes of the car are manually set. It should be noted in this connection that the jaw clutch 32 cannot be disengaged while tension is maintained on the cable 1 and, therefore, the car puller C cannot be operated until the brakes of the vehicle have been set. Moreover, the flashing lights and horn will remain energized and thereby provide warning signals until the clutch has been disengaged. This will insure the fact that the operator will not hold the vehicle on a grade by means of the cable, thereby maintaining the cable under tension through the magnetic brake 53.

The control housing H is located in a position where it is possible to view the entire area. If for any reason the area in which the car puller is to be operated is not cleared of personnel promptly, the operator in the control housing H will release the starter switch 125. This will prevent any circuit from being completed to the motor 41. However, inasmuch as the jaw clutch 32 is engaged, the horn 91 will sound and the light 92 will provide flashing signals. After the area has been cleared, the operator can again close the starter switch 125. The emergency release switch 126 is provided in the control housing H for emergency use in the event that the starter switch does not disconnect when it is released.

In order to adjust the overload limit switch 55, the rods 59 are secured to the upstanding studs 58 and the plate 61 is secured to the rods 59 through the nuts 62. Thereupon, a jack J is inserted between the plate 61 and the upper surface of the plate 19. The overload limit switch 55 is set to a desired pressure which would be the pressure causing the plate 19 to shift downwardly to close the switch 55. Thereupon the jack J is extended causing the plate 19 to shift downwardly and thereby provides a mechanism for testing the setting of the limit switch 55.

The overload limit switch 79 on the car puller C' is adjusted in similar manner. In this case, the test jack is inserted into the test jack pocket 85 and extended so that the support plate 74 is shifted downwardly. Thereupon the plate 82 is removed by removal of the bolts 83 providing access to the limit switch 79 for adjustment thereof. It can thus be seen that the various limit switches cannot be tampered with inasmuch as access is not convenient and any unauthorized individual attempting to adjust the limit switch would be noticed by supervisory personnel in view of the amount of time required to obtain access thereto. It can also be seen that inasmuch as the plates 22 extend below the foundation plate 10, it is virtually impossible to wedge a crowbar or similar heavy implement between the plate 19 and the foundation plate 10.

In order to describe the operation of the electrical circuitry in FIGURE 11 it can be assumed that the motor 41 is de-energized and that the jaw clutch 32 is in the disengaged position. If it is further assumed that load maintained on the cable 1 is not sufficient to shift the plate 19 downwardly and open the limit switch 55, that this limit switch 55 will remain in the closed position as shown in FIGURE 11. Therefore, if it is desired to operate the car puller C, the jaw clutch 32 is engaged, thereby closing the jaw clutch limit switch 127. Thereafter, the power control switch 122 is closed connecting the electrical circuiting to the source of 440 volt alternating current through the conductors of the cord set 119. Since the jaw clutch switch 127 and the overload limit switch 55 are closed, circuits will also be completed to the coil 107 of the relay 102 closing contacts 113 and to coil 105 of relay 100 closing contacts 110, 111.

In order to start the moving operation, the operator will close the starter switch 125, thereby completing a circuit to the coil 108 of the relay 103, through the closed contacts 113. This will in turn also complete a circuit to the coil 106 of the relay 101. As this occurs, the contacts 112 of the relay 101 will close. Upon closing of the contacts 112, a circuit is then completed to the light 92 and the horn 91 in the manner as shown in FIGURE 11. As indicated above a circuit is also completed to the coil 108 of the relay 103 causing the contacts 114 to close. As this occurs, the light 92 and the horn 91 will remain energized. The contacts 115, which are time-delay contacts will not close for a predetermined interval which has been established to be 15 seconds, thereby providing ample warning to any person on the area that the vehicles will be moving within 15 seconds from the sounding of the horn and the flashing of the light. After this 15 second period, the time-delay contacts 115 will close, thereby completing a circuit to the relay coil 109. The completion of the circuit to the relay coil 109 of the motor starter relay 104 will close the contacts 123, thereby completing a circuit to the puller motor 41 and causing the same to actuate. It will also open the normally closed motor auxiliary contacts 116, thereby preventing any completion of circuit to the magnetic brake 53. It can thus be seen that the puller motor 41 will continue to operate as long as the starter switch 125 is held in the closed position.

When it is desired to stop the moving of the vehicles the operator releases the starter switch 125, thereby breaking the circuits to the respective relays 105, 106 and 107. This will break the circuit to the coil 109 and thereby cause the normally open contacts 123 to open. This will in turn break the circuit between the 440 volt source of alternating electrical current and the puller motor 41, causing the same to de-energize. By further reference to FIGURE 12, it can be seen that current flow will be discontinued to the electric brake 53 causing the same to close. This action will hold the vehicle V until the brake 53 has been released. However, it can be seen that the circuit to the horn 91 and the light 92 will remain closed as long as the jaw clutch limit switch 55 remains in the closed position, and thereby continue to actuate the horn 91 and the light 92 until the switch 127 is open. Furthermore, it can be seen that if at any time the load on the cable 1 exceeds the predetermined limit established by the overload limit switch 55, the latter will open, thereby breaking the circuit to the relay coil 109. As a result thereof the motor 41 will become de-energized.

If upon releasing the starter switch 125, the same does not break the circuit as designed to do, the operator can open the power control switch 122 which will break the circuit to the motor 41 causing de-energization thereof. This will also break the circuit to the magnetic brake 53 causing the same to lock and thereby prevent the actuation of the cable drum 31.

It should be understood that changes and modifications can be made in the form, construction, arrangement and combination of parts presently described and pointed out, and may be made and substituted without departing from the nature and principle of my invention.

Having thus described my invention, what I desire to claim and secure by Letters Patent is:

1. In a powered winch including a plate with a cable drum mounted thereon and having a cable trained therearound for attachment to a load, and a prime mover operatively associated therewith for powering said cable drum; a safety overload device comprising base means operatively associated with said plate and being disposed therebeneath, a torsion bar operatively connecting said plate to said base means and being adapted to bias said plate in an upward direction about said torsion bar, and limit switch means operatively associated with said prime mover and being adapted to de-energize said prime mover when the vertical downward vector of the force attached to cable exceeds the vertical upward vector of the force created by the biasing means.

2. A safety overload system for powered winches including a cable drum and a prime mover operatively associated therewith for powering the same; said safety overload system comprising a first relay operatively associated with said prime mover and being adapted to cause energization of said prime mover upon actuation of said relay, manually operable switch means operatively associated with said first relay for optional actuation thereof, second relay means operatively associated with said first relay means and said manually operable switch and being adapted to cause energization of said prime mover and said first relay when said manually operable switch means is actuated, and safety limit switch means operatively associated with said first and second relays and said prime mover and being adapted to prevent actuation of said second relay and said prime mover when the load on said cable drum exceeds a predetermined limit.

3. A safety overload system for powered winches including a cable drum and a prime mover operatively associated therewith for powering the same; said safety overload system comprising a first relay operatively associated with said prime mover and being adapted to cause energization of said prime mover upon actuation of said relay, first manually operable switch means operatively associated with said first relay for optional actuation thereof, second relay means operatively associated with said first relay means and said first manually operable switch and being adapted to cause energization of said prime mover and said first relay when said first manually operable switch means is actuated, second manually operable switch means operatively interposed between said prime mover and cable drum and being connected to said second relay and being adapted to control actuation of said second relay when said first manually operable switch means is actuated, and safety limit switch means operatively associated with said first and second relays and said prime mover and being adapted to prevent actuation of said second relay and said prime mover when the load on said cable drum exceeds a predetermined limit.

4. A safety overload system for powered winches including a cable drum and a prime mover operatively associated therewith for powering the same; said safety overload system comprising warning signal means operatively associated with said powered winch, a first relay operatively associated with said prime mover and being adapted to cause energization of said prime mover upon actuation of said relay, first manually operable switch means operatively associated with said first relay for optional actuation thereof, second relay means operatively associated with said first relay means and said first manually operable switch and being adapted to cause energization of said prime mover and said first relay when said first manually operable switch means is actuated, second manually operable switch means operatively interposed between said prime mover and cable drum and being connected to said second relay and being adapted to control actuation of said second relay when said first manually operable switch means is actuated, a third relay operatively associated with said warning signal means and said first and second relays and being adapted to actuate said warning signal means when said first manually operable switch means is closed, and safety limit switch means operatively associated with said first and second relays and said prime mover and being adapted to prevent actuation of said second relay and said prime mover when the load on said cable drum exceeds a predetermined limit.

5. A safety overload system for powered winches including a cable drum and a prime mover operatively associated therewith for powering the same; said safety overload system comprising warning signal means operatively associated with said powered winch, a first relay operatively associated with said prime mover and being adapted to cause energization of said prime mover upon actuation of said relay, first manually operable switch means operatively associated with said first relay for optional actuation thereof, second relay means operatively associated with said first relay means and said first manually operable switch and being adapted to cause energization of said prime mover and said first relay when said first manually operable switch means is actuated, second manually operable switch means operatively interposed between said prime mover and cable drum and being connected to said second relay and being adapted to control actuation of said second relay when said first manually operable switch means is actuated, a third relay operatively associated with said warning signal means and said first and second relays and being adapted to actuate said warning signal means when said first manually operable switch means is closed, time delay means interposed between said third relay and said first relay and being adapted to prevent actuation of said prime mover for a predetermined time period after actuation of said warning signal means, and safety limit switch means operatively associated with said first and second relays and said prime mover and being adapted to prevent actuation of said second relay and said prime mover when the load on said cable drum exceeds a predetermined limit.

6. A safety overload system for powered winches including a cable drum and a prime mover operatively associated therewith for powering the same; said safety overload system comprising warning signal means operatively associated with said powered winch, a first relay operatively associated with said prime mover and being adapted to cause energization of said prime mover upon actuation of said relay, first manually operable switch means operatively associated with said first relay for optional actuation thereof, second relay means operatively associated with said first relay means and said first manually operable switch and being adapted to cause energization of said prime mover and said first relay when said first manually operable switch means is actuated, second manually operable switch means operatively interposed between said prime mover and cable drum and being connected to said second relay and being adapted to control actuation of said second relay when said first manually operable switch means is actuated, a third relay operatively associated with said warning signal means and said first and second relays and being adapted to actuate said warning signal means when said first manually operable switch means is closed, time delay means interposed between said third relay and said first relay and being adapted to prevent actuation of said prime mover for a predetermined time period after actuation of said warning signal means, safety limit switch means operatively associated with said first and second relays and said prime mover and being adapted to prevent actuation of said second relay and said prime mover when the load on said cable drum exceeds a predetermined limit, and braking means operatively associated with said prime mover and cable drum and being adapted to lock said cable drum in a fixed position when said prime mover is de-energized.

7. An apparatus for moving a transportable unit along a trackway to preselected positions on said trackway comprising in combination a winch mechanism, a prime mover operatively connected to said winch mechanism, switch means operatively connected to said prime mover for actuation of said prime mover at the will of an operator, time delay means operatively connected to said switch means preventing actuation of said prime mover for a preselected period of time, advisory signal means operatively connected to said time delay means for providing advisory signals during said preselected period of time, a multi-direction sheave mounted in fixed relation adjacent to said trackway, at least one snatch block located at a position adjacent to said trackway and being spaced from said multi-direction sheave, a cable operatively connected to said winch mechanism and being trained about said sheave and said snatch blocks for ultimate attachment to a transportable unit, whereby upon actuation of said prime mover after said preselected period of time the transportable unit can be moved to a preselected position.

8. An apparatus for moving a transportable unit along a trackway to preselected positions on said trackway comprising in combination a winch mechanism, a prime mover operatively connected to said winch mechanism, switch means operatively connected to said prime mover for actuation of said prime mover at the will of an operator, time delay means operatively connected to said switch means preventing actuation of said prime mover for a preselected period of time, advisory signal means operatively connected to said time delay means for providing advisory signals during said preselected period of time, a multi-direction sheave mounted in fixed relation adjacent to said trackway, a plurality of snatch blocks located at positions adjacent to said trackway and at preselected spaced distances from said multi-direction sheave, and a cable operatively connected to said winch mechanism and being trained about said sheave and one of said snatch blocks for ultimate attachment to a transportable unit, whereby upon actuation of said prime mover after said preselected period of time the transportable unit can be moved to a preselected position.

9. An apparatus for moving a transportable unit along a trackway to preselected positions on said trackway comprising in combination a winch mechanism, a prime mover operatively connected to said winch mechanism for actuation at the will of an operator, a multi-direction sheave mounted in fixed relation adjacent to said trackway, a plurality of snatch blocks located at positions adjacent to said trackway and at preselected spaced distances from said multi-direction sheave, a cable operatively connected to said winch mechanism and being trained about said sheave and one of said snatch blocks for ultimate attachment to a transportable unit, clutch means operatively interposed between said prime mover and winch mechanism and being capable of optionally engaging and disengaging said prime mover and winch mechanism, first limit switch means operatively associated with said clutch means and preventing energization of said prime mover when said prime mover and winch mechanism are disengaged, and second limit switch means operatively connected to said prime mover and being adapted to de-energize said prime mover when the force exerted by said transportable unit is greater than a preselected amount whereby upon actuation of said prime mover the transportable unit can be moved to a preselected position.

10. An apparatus for moving a transportable unit along a trackway to preselected positions on said trackway comprising in combination a winch mechanism, a prime mover operatively connected to said winch mechanism, switch means operatively connected to said prime mover for actuation of said prime mover at the will of an operator, time delay means operatively connected to said switch means preventing actuation of said prime mover for a preselected period of time, a multi-direction sheave mounted in fixed relation adjacent to said trackway, a plurality of snatch blocks located at positions adjacent to said trackway and at preselected spaced distances from said multi-direction sheave, a cable operatively connected to said winch mechanism and being trained about said sheave and one of said snatch blocks for ultimate attachment to a transportable unit, clutch means operatively interposed between said prime mover and winch mechanism and being capable of optionally engaging and disengaging said prime mover and winch mechanism, first limit switch means operatively associated with said clutch means and preventing energization of said prime mover when said prime mover and winch mechanism are disengaged, and second limit switch means operatively connected to said prime mover and being adapted to de-energize said prime mover when the force exerted by said transportable unit is greater than a preselected amount whereby upon actuation of said prime mover the transportable unit can be moved to a preselected position.

11. An apparatus for moving a transportable unit along a trackway to preselected positions on said trackway comprising in combination a winch mechanism, a prime mover operatively connected to said winch mechanism, switch means operatively connected to said prime mover for actuation of said prime mover at the will of an operator, time delay means operatively connected to said switch means preventing actuation of said prime mover for a preselected period of time, advisory signal means operatively connected to said time delay means for providing advisory signals during said preselected period of time, a multi-direction sheave mounted in fixed relation adjacent to said trackway, a plurality of snatch blocks located at positions adjacent to said trackway and at preselected spaced distances from said multi-direction sheave, a cable operatively connected to said winch mechanism and being trained about said sheave and one of said snatch blocks for ultimate attachment to a transportable unit, clutch means operatively interposed between said prime mover and winch mechanism and being capable of optionally engaging and disengaging said prime mover and winch mechanism, first limit switch means operatively associated with said clutch means and preventing energization of said prime mover when said prime mover and winch mechanism are disengaged, and second limit switch means operatively connected to said prime mover and being adapted to de-energize said prime mover when the force exerted by said transportable unit is greater than a preselected amount whereby upon actuation of said prime mover the transportable unit can be moved to a preselected position.

12. An apparatus for moving a transportable unit along a trackway to preselected positions on said trackway comprising in combination a winch mechanism, a prime mover operatively connected to said winch mechanism for actuation at the will of an operator, a multi-direction sheave mounted in fixed relation adjacent to said trackway, a plurality of snatch blocks located at positions adjacent to said trackway and at preselected spaced distances from said multi-direction sheave, a cable operatively connected to said winch mechanism and being trained about said sheave and one of said snatch blocks for ultimate attachment to a transportable unit, whereby upon actuation of said prime mover the transportable unit can be moved to a preselected position, overload limiting means operatively interposed between said prime mover and said winch mechanism for automatically de-energizing said prime mover when an excessive load is connected to said cable, braking means operatively associated with said overload limiting means for locking the transportable unit in the position when located at the time said prime mover was de-energized by said overload limiting means, and manually operable emergency release means operatively associated with said overload limiting means and braking means for by-passing said overload limiting means and releasing said braking means.

13. A powered winch comprising base means, powered cable means operatively mounted on said base means and being adapted to swing through an arc with respect to said base means, manually operable switch means operatively connected to said powered cable means for permitting energization thereof, time delay means operatively connected to said switch means preventing energization thereof for a preselected period of time after actuation, a flexible cable operatively attached to said cable means and being adapted for attachment to a load where the load thus attached will create a first force on said powered cable means urging the same in a first direction, biasing means operatively mounted on said base means and exerting a second force on said cable means which is opposite in direction to said first force for biasing said cable means in a second direction which is opposite to said first direction, clutch means operatively connected to said powered cable means and being shiftable to an engageable position permitting operation of said powered cable means and to a disengageable position preventing operation of said powered cable means, first limit switch means operatively connected to said clutch means preventing energization of said powered cable means when said clutch means is in its disengageable position, and second limit switch means operatively connected to said base means and cable means and being adapted to de-energize said powered cable means when the load on said cable creates a force which is greater than the force created by said biasing means.

14. A powered winch comprising base means, powered cable means operatively mounted on said base means and being adapted to swing through an arc with respect to said base means, manually operable switch means operatively connected to said powered cable means for permitting energization thereof, time delay means operatively connected to said switch means preventing energization thereof for a preselected period of time after actuation, advisory signal means operatively connected to said time delay means for providing advisory signals during said preselected period of time, a flexible cable operatively attached to said cable means and being adapted for attachment to a load where the load thus attached will create a first force on said powered cable means urging the same in a first direction, biasing means operatively mounted on said base means and exerting a second force on said cable means which is opposite in direction to said first force for biasing said cable means in a second direction which is opposite to said first direction, and limit switch means operatively connected to said base means and cable means and being adapted to de-energize said powered cable means when the load on said cable creates a force which is greater than the force created by said biasing means.

15. A powered winch comprising base means, a plate pivotally mounted on said base means, biasing means interposed between said plate and base means causing a force biasing said plate in a first direction, a cable drum rotatably mounted on said plate, a prime mover operatively associated with said cable drum for rotating the same, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

16. A powered winch comprising base means, a torsion bar operatively mounted on said base means, a plate operatively attached to said torsion bar and being pivotal therewith with respect to said base means, means retaining said torsion bar on said base means so that it causes a force tending to bias said plate in a first direction, a cable drum rotatably mounted on said plate, a prime mover operatively associated with said cable drum for rotating the same, a flexible cable trained about said cable drum and being adapted for attachment to a load, wherein the load when applied to the cable will create a force tending to bias the plate in a second direction, which second direction is opposite to said first direction, and limit switch means operatively connected to said base means and said prime mover and being adapted to de-energize said prime mover when the force exerted by a load on said cable is greater than the force exerted by said biasing means.

17. A powered winch comprising base means, a plate pivotally mounted on said base means, at least one compression spring operatively interposed between said plate and base means causing a force biasing said plate in a first direction, a cable drum rotatably mounted on said plate, a prime mover operatively associated with said cable drum for rotating the same, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

18. A powered winch comprising base means, a torsion bar operatively mounted on said base means, a plate operatively attached to said torsion bar and being pivotal therewith with respect to said base means, means retaining said torsion bar on said base means so that it causes a force tending to bias said plate in a first direction, a cable drum rotatably mounted on said plate, a prime mover operatively associated with said cable drum for rotating the same, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

19. A powered winch comprising base means, a plate pivotally mounted on said base means, biasing means interposed between said plate and base means causing a force biasing said plate in a first direction, a cable drum rotatably mounted on said plate, a prime mover operatively associated with said cable drum for rotating the same, fluid clutch means operatively interposed between said cable drum and said prime mover for maintaining relatively uniform power application to said cable drum, a flexible cable trained about said cable drum and being adapted for attachment to a load, wherein the load when applied to the cable will create a force tending to bias the plate in a second direction, which second direction is opposite to said first direction, gear operable clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

20. A powered winch comprising base means, a plate pivotally mounted on said base means, biasing means interposed between said plate and base means causing a force biasing said plate in a first direction, a cable drum rotatably mounted on said plate, a prime mover operatively associated with said cable drum for rotating the same, manually operable switch means operatively connected to said prime mover for permitting energization thereof, time delay means operatively connected to said switch means and prime mover preventing energization thereof for a preselected period of time after actuation of said switch means, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to deenergize said prime mover when the force exerted by a load on said cable is greater than the force exerted by said biasing means.

21. A powered winch comprising base means, a plate pivotally mounted on said base means, biasing means interposed between said plate and base means causing a force biasing said plate in a first direction, a cable drum rotatably mounted on said plate, a prime mover operatively associated with said cable drum for rotating the same, manually operable switch means operatively connected to said prime mover for permitting energization thereof, time delay means operatively connected to said switch means and prime mover preventing energization thereof for a preselected period of time after actuation of said switch means, advisory signal means operatively connected to said time delay means for providing advisory signals during said preselected period of time, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

22. A powered winch comprising base means, a plate pivotally mounted on said base means, biasing means interposed between said plate and base means causing a force biasing said plate in a first direction, a cable drum rotatably mounted on said plate, a prime mover operatively associated with said cable drum for rotating the same, manually operable switch means operatively connected to said prime mover for permitting energization thereof, time delay means operatively connected to said switch means and prime mover preventing energization thereof for a preselected period of time after actuation of said switch means, advisory signal means operatively connected to said time delay means for providing advisory signals during said preselected period of time, means for maintaining said advisory signal means in an energized state until said clutch means is actuated to disengage said prime mover from said cable drum, a flexible cable trained about said cable drum and being adapted for attachment to a load, wherein the load when applied to the cable will create a force tending to bias the plate in a second direction, which second direction is opposite to said first direction, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

23. In a powered winch including a plate with a cable drum mounted thereon and having a cable trained therearound for attachment to a load, and a prime mover operatively associated therewith for powering said cable drum; a safety overload device comprising pivot means for pivotally supporting said plate, biasing means disposed beneath said plate for biasing said plate in an upward direction about said pivot means, clutch means operatively interposed between said prime mover and cable drum and being capable of optionally engaging and disengaging said prime mover and cable drum, first limit switch means operatively associated with said clutch means and preventing energization of said prime mover when said prime mover and cable drum are disengaged, and second limit switch means operatively connected to said base means and said prime mover and being adapted to de-energize said prime mover when the force exerted by a load on said cable is greater than the force exerted by said biasing means.

References Cited by the Examiner

UNITED STATES PATENTS

| 902,510 | 10/1908 | Turpin | 254—147 |
| 1,298,499 | 3/1919 | Hansen | 187—12 |
| 1,557,784 | 10/1925 | Sharpnack | 254—147 |
| 2,025,928 | 12/1935 | Wunsch | 254—173 |
| 2,699,919 | 1/1955 | Addicks | 254—173 |

FOREIGN PATENTS

| 227,411 | 5/1961 | Austria. |
| 834,834 | 10/1937 | France. |
| 1,190,922 | 1/1958 | France. |
| 972,868 | 10/1959 | Germany. |
| 1,078,489 | 3/1960 | Germany. |

EVON C. BLUNK, *Primary Examiner.*

H. C. HORNSBY, *Assistant Examiner.*